Aug. 26, 1969
J. O. PIRTLE
3,463,078
DEEP FAT FRYING APPARATUS
Filed Oct. 4, 1967
3 Sheets-Sheet 1
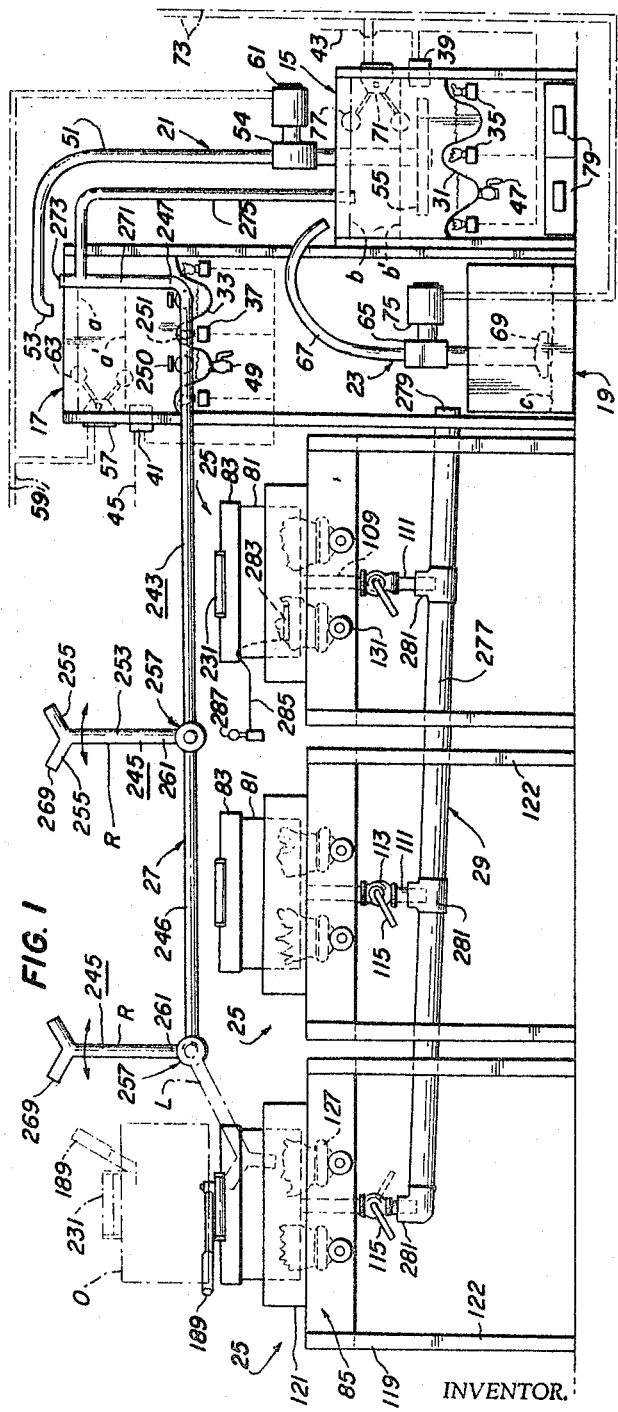
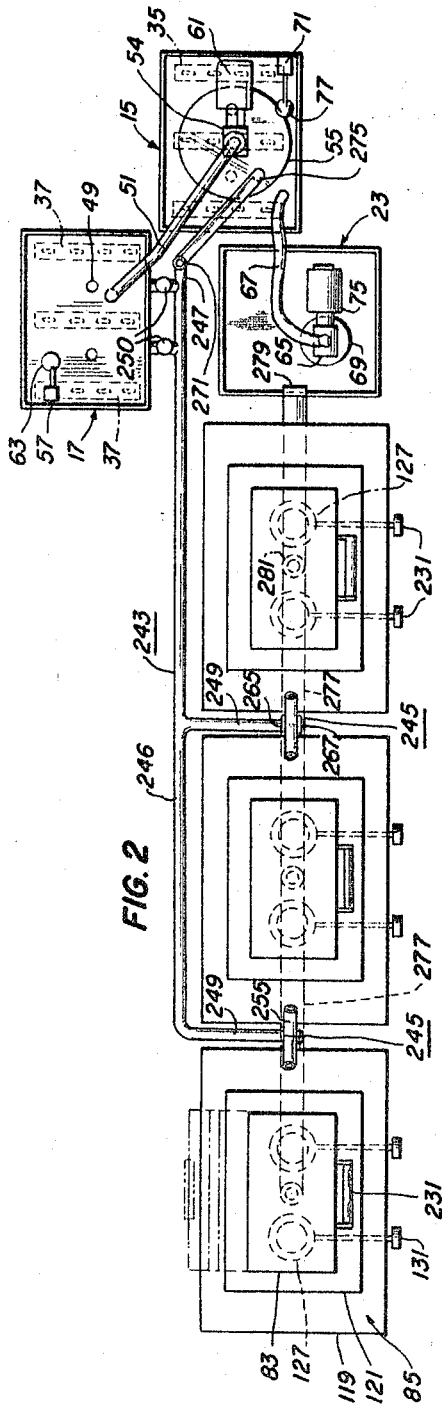
INVENTOR.
JACK O. PIRTLE
BY John R. Walker, III
Attorney

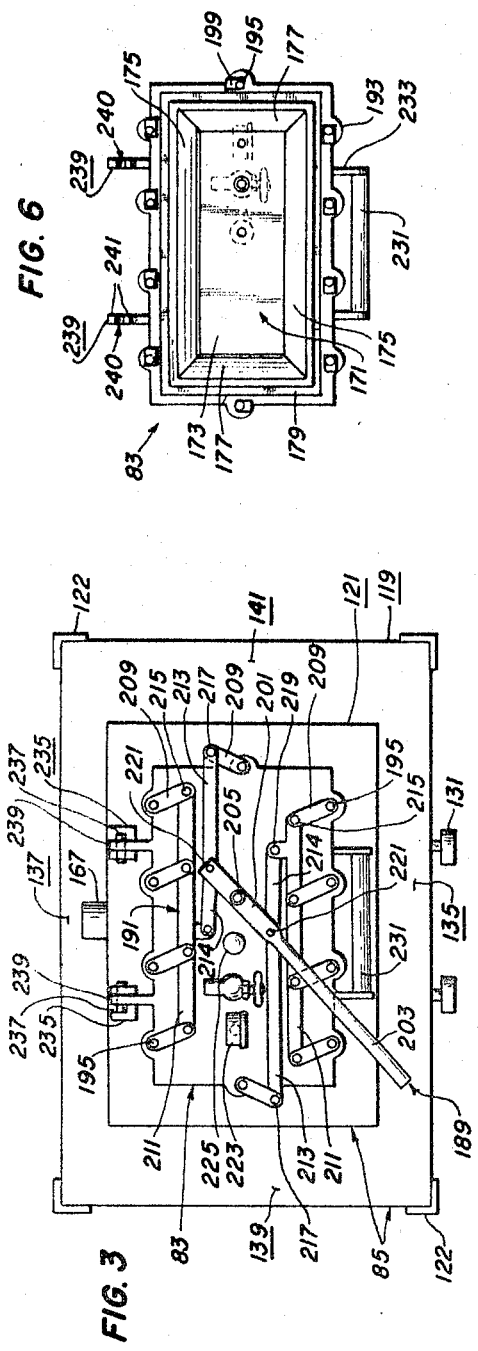

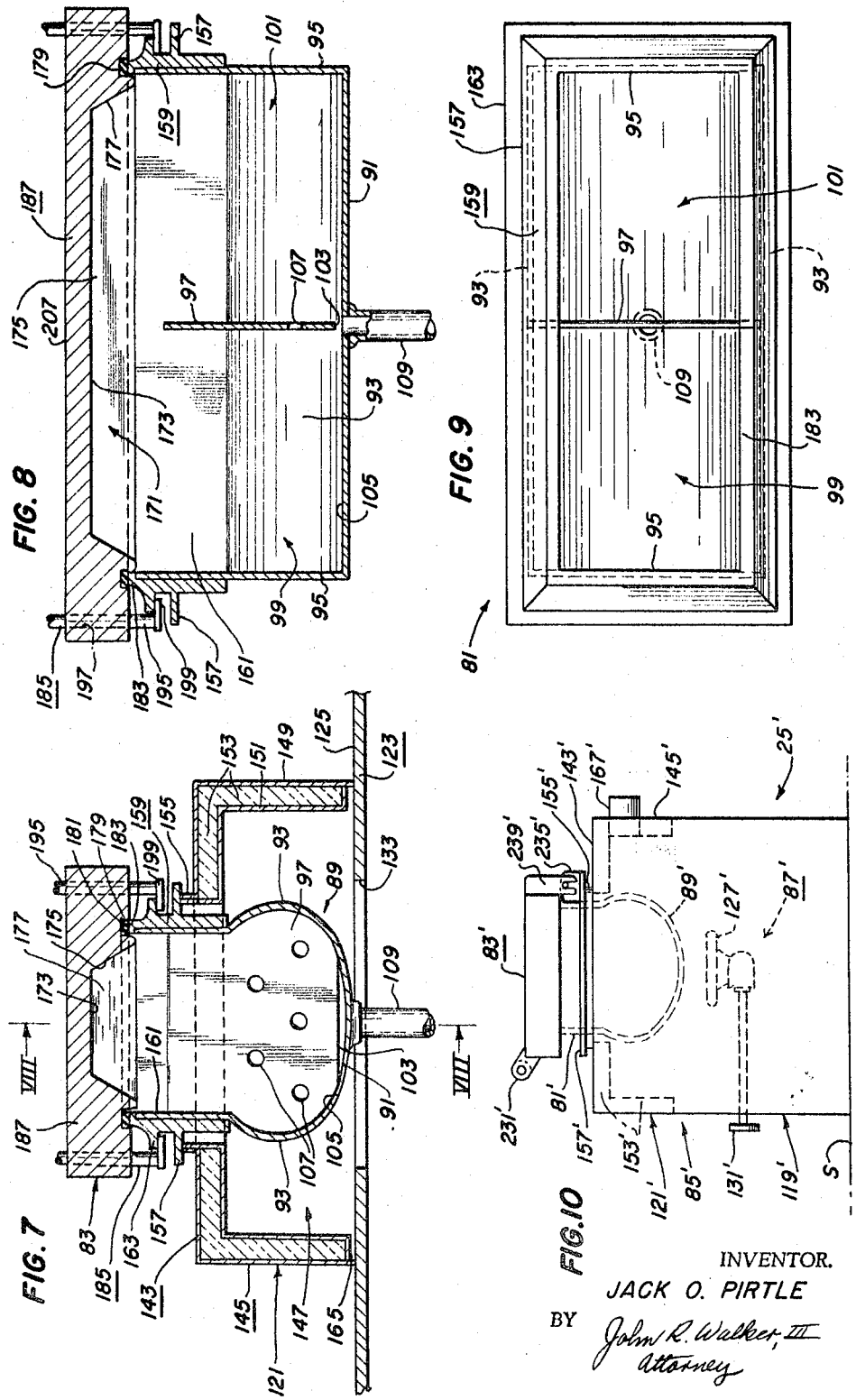

United States Patent Office 3,463,078
Patented Aug. 26, 1969

3,463,078
DEEP FAT FRYING APPARATUS
Jack O. Pirtle, 2419 Union Ave., Memphis, Tenn. 38112
Filed Oct. 4, 1967, Ser. No. 672,825
Int. Cl. A47j 37/12
U.S. Cl. 99—403          20 Claims

ABSTRACT OF THE DISCLOSURE

Apparatus for pressurized deep fat frying to cook chicken, fish, potatoes, onions or other food items. The apparatus is particularly suitable for deep fat cooking large quantities of food and for use in restaurants or other commercial establishments specializing in take-out food orders. The apparatus preferably includes a row of cooking units with each unit having an open topped drainable frypan arranged over gas burner means and with the food items being adapted to be deep fat fried in the pan.

Each cooking unit has a cyclic operation and is adapted for rapidly cooking successive batches of food items. This is made possible by virtue of having a continuously available supply of preheated filtered liquid cooking fat and having means for rapidly introducing the cooking fat into the frypan of each cooking unit and for rapidly draining the cooking unit frypan. The used fat from successive batches of food items is substantially continuously processed by being conducted through a plurality of tanks; the preheated filtered fat is stored in one of the tanks and provides a continuously available supply of clean, hot liquid fat for each cooking unit. Each cooking unit includes a frypan having smoothly contoured bottom and side portions, and also heat insulated wall means spaced closely around the sides of the frypan. The above structure facilitates the uniform heating of the frypan and proper circulation of the liquid fat during cooking.

BACKGROUND OF THE INVENTION

Field of the invention

It pertains to pressurized deep fat cooking and to such apparatus having means for deep fat frying food items in a pressurized chamber.

Description of the prior art

Pressurized deep fat frying apparatus of prior design apparently do not provide means for introducing filtered preheated fat liquid into a deep fat frying chamber. Nor does the prior art apparently disclose apparatus or a method of rapidly filling and draining a frypan for rapidly frying successive batches of food items.

Patents Nos. 3,159,095 and 3,314,416 disclose means for filtering the liquid fat and re-using the fat, however, the patents apparently do not disclose means for preheating the fat before injection into the food frying pot or chamber. In the structure of the above-mentioned patents, the fat liquid is drained from and returned to the frying chamber or pot through the same pipe and through the so-called cold zone in the lower interior of the frying pot. Apparently, the typical prior art commercial-type pressurized deep fat fry chamber includes a cold zone in the lower interior of the chamber for collecting crackling, residue food particles, moisture and other food waste.

In the typical commercial prior art cooking chamber the food items are held or contained in a rack formed of screen material. The food items are substantially constrained in the screened rack and are not free to circulate or turn about in the fat liquid as they are being cooked. Such action results often in a food item being cooked more on one side than on the other side or with the food item having portions cooked more or less than desirable. The typical prior art deep fat frying chamber is large size and is adapted to contain a large body of substantially stagnant cooking fat. The typical prior art frying chamber includes a so-called cold zone in the lower portion of the chamber for catching and containing the sediments or residue from the food items. When cooking in large bodies of liquid fat and when cooking in large cold zone type frying chambers, there is difficulty in obtaining uniform heating and circulation of the liquid fat in the chamber. This causes difficulty in maintaining a steady, even temperature around the food item or in the upper portions of the fat contained within the large cooking chambers. The large body of grease in the typical cold zone type frying chamber is very difficult to heat uniformly and particularly in the upper levels of the fat body and such levels in which the food items are cooked.

SUMMARY OF THE INVENTION

The cyclic operation of the present invention in conjunction with a substantially small frypan which is drained and refilled rapidly with substantially each batch of food items are important features in this invention. The fat is filtered, preheated and stored in a tank at a temperature (375° F.) which is only a few degrees less than the cooking temperature (410° F.) required for the cooking fat in each cooking unit. After cooking a batch of food items in the frypan of a cooking unit the used fat each time is drained and the pan refilled with a clean, hot fat. The food items are placed in the fat and only a short time is required to bring the fat up to cooking temperature and to cook the food items. The frypan in each cooking unit does not include a cold zone nor are the food items supported in a screened rack. The food items, as they are being cooked in the frypan of the present invention, may turn about or move freely with the circulating fat in the frypan. They are cooked evenly on all sides and uniformly. The charge of used fat which is drained from the frypan with each successive batch of cooking items, carries with it unwanted food cooking residues. The small charge of used fat is conducted through large volume tanks of fat and is heated, filtered and stored to provide a continuous supply of fat.

The construction of each cooking unit is also of particular importance. The frypan of each cooking unit includes a frypan body formed of substantially light gauge sheet metal and is formed with smoothly rounded bottom and side portions. The smoothly rounded outside surfaces of the frypan causes the gas flame (gas is preferably used for heating) to flow upwardly and follow closely around the lower contours of the frypan. This causes even uniform heating of the fat within the pan. Also, the smooth rounded interior surfaces of the frypan causes the fat to roll or circulate freely as it is brought up to and is maintained at a cooking temperature. This causes the body of fat in the frypan to be of uniform temperature throughout with no hot or cold zones.

Other structures are included in each cooking unit which causes uniform heating of the fat in the frypan: Each cooking unit includes base means for housing the gas burner means and for removably supporting a frypan. The base means preefrably includes insulated wall means extending circumferentially about the lower portions of the frypan and such wall means which function to control the heating of the pan; the vertical wall means define substantially an annular chamber around the lower portions of the frypan. The insulated wall means around the lower portions of the frypan shields the frypan from ambient air currents and radiates the heat uniformly about the bottom and side portions of the pan. Such action as this further contributes to the uniform heating of the pan and the fat liquid contained in the pan.

The base means of the present invention may be constructed to include a lower base assembly generally in the form of an ovenless stove and an upper base assembly removably resting on the lower base assembly. By such construction the lower base assembly houses the burners and removably supports the upper base assembly and frypan. Such an arrangement permits the lower base assembly and burner means to be used substantially in a conventional manner for heating and cooking food items contained in typical hand-handled pots and pans.

BRIEF DESCRIPTION OF THE DRAWING

FIG. 1 is a somewhat schematic front elevational view of the cooking apparatus of the present invention.

FIG. 2 is substantially a top view of FIG. 1.

FIG. 3 is a top view of a preferred embodiment of a cooking unit of the deep fat frying apparatus.

FIG. 4 is a sectionalized front view of the cooking unit of FIG. 3.

FIG. 5 is a sectionalized end view of the cooking unit taken as from the left of FIG. 4.

FIG. 6 is an underside view of the lid of the cooking unit.

FIG. 7 is an enlarged transverse sectional view of a preferred cooking unit taken as on the line VII—VII of FIG. 4, and with lid parts removed for a better showing.

FIG. 8 is a longitudinal sectional view of the cooking unit taken as on the line VIII—VIII of FIG. 7.

FIG. 9 is a top interior view of the frypan of the cooking unit with the lid removed.

FIG. 10 illustrates a modified embodiment of a cooking unit.

DESCRIPTION OF THE PREFERRED EMBODIMENT

FIGS. 1 and 2 illustrate the preferred embodiment of the fry cooking apparatus of the invention. The apparatus primarily includes first, second and third tanks 15, 17, 19; first and second liquid conveying means 21, 23; a plurality of cooking units 25; and supply and drain conduit means 27, 29. With reference to FIG. 1 the general cyclic operation of the apparatus may be appreciated and the flow of the liquid in the apparatus as viewed in FIG. 1 may be considered to be generally counterclockwise: Liquid fat is adapted to be moved from first tank 15 through first conveying means 21 into second tank 17, and from second tank 17 through supply conduit means 27 to a desired one of cooking units 25; from cooking unit 25 through drain conduit 29 to third tank 19, and from tank 19 through second liquid conveying means 23 back into first tank 15.

First and second tanks 15, 17 are substantially alike and include respectively horizontally undulated bottom walls 31, 33. The undulations respectively of bottom walls 31, 33 of tanks 15, 17 provide cold zones in the lower interiors of the respective tanks. Heating elements in the form of gas burners 35, 37 are arranged respectively under first and second tanks 15, 17 for pre-heating the liquid fat and maintaining it in a free flowing condition. Thermostat means 39, 41 operably fitted respectively in a well known manner in gas supply lines 43, 45 of first and second tank means 15, 17 regulate the temperature of the liquid fat in the respective tanks (see FIG. 1). Thermostat means 39 is responsive to temperature changes in the fat liquid contained in first tank 15; the thermostat means controls the passage of gas through supply lines 43 and the height of the flame at gas burners 35; the controlling of the flame height at burners 35 is operative for maintaining the temperature of the fat liquid in tank 15 at a selected range. In like manner, thermostat means 41 in second tank 17 controls the passage of gas through burners 37 thereby maintaining the temperature of the liquid fat in tank 17 within a selected range. Preferably, the liquid fat in second tank 17 is hotter than the liquid fat in tank 15: Thermostat means 39 in tank 15 preferably is adjusted to maintain the temperature of the fat at substantially 275° F.; thermostat means 41 in second tank means 17 is adjusted to maintain the temperature in tank 17 at approximately 375° F. Tanks 15, 17 are fitted with hand-operable drain valves 47, 49.

First liquid conveying means 21 for conveying liquid from first tank 15 to second tank 17 includes first conduit means 51 having an inlet end arranged in tank 15 and an outlet end 53 arranged over the interior of tank 17. A pump 54 is interposedly fitted in conduit 51 and provides force means for lifting the liquid from tank 15 to tank 17. Filter means including a filter member 55 is arranged over the lower suction end of conduit 51 and filters foreign material from the fat as it is conveyed through the conduit. A float-type switch 57 operably fitted in electric lines 59 energizing pump motor 61 controls the operation of pump 54. Switch 57 is fitted in the upper wall portion of second tank 17 with float 63 arranged in the interior of the tank. The operation of switch 57 maintains the level of the liquid in tank 17 between an upper and a lower level indicated respectively a, a' in FIG. 1.

Second liquid conveying means 23 conveys fat liquid from third tank 19 to first tank 15. Liquid conveying means 23 includes an electrically-driven pump 65 operably fitted in conduit means 67. A strainer 69 is preferably fitted over the lower suction end of conduit means 67 for straining food waste particles or the like contained in tank 19. A float switch 71 operably interposedly fitted in electric line 73 controls the passage of current to pump motor 75 and the operation of the pump. Float switch 71 is fitted in the upper wall of tank 15 with float member 77 arranged in the interior of the tank. FIG. 1 illustrates the operative upper and lower positions of float 77 and the upper and lower levels of the fat liquid indicated b, b' respectively. The sediment level in third tank 19 is indicated c. Tank 19 does not include heat means for heating the liquid fat and is mainly a sediment tank for catching and straining crackling and coarse food waste particles from the fat. Preferably, pump 65 and conduit means 67 may be readily removed from tank 19 and the tank manipulated for dumping the liquid fat contents. Dumping the fat contents of tank 19 is done infrequently as for example, at the end of a day operation of the apparatus. A pair of drawer-like dump pans 79 preferably is positioned under first tank 15. Pans 79 are adapted for catching the fat and waste sediments from tank 15 at cleaning intervals.

Each cooking unit 25 includes pan means 81, lid means 83, base means 85, and heating means 87. A preferred form of cooking unit 25 is illustrated in FIGS. 1–9.

Pan 81 includes a pan body 89 preferably formed of metal material such as .125″ aluminum. Body 89 is generally elongated and includes smoothly contoured bottom and sidewall portions 91, 93 (see FIGS. 7 and 8). Preferably, the ends of body 89 are vertical and defined respectively by planar end walls 95. Preferably body 89 is equally divided by a partition member 97 and defines left and right cooking chambers 99, 101. Lower edge 103 of partition 19 preferably is raised slightly above the bottom interior surface 105 of body 89 for free passage of liquid fat between left and right cooking chambers 99, 101. Partition 79 is also preferably provided with apertures 107 for free passage of fat between the left and right cooking chambers. A drain passageway including upper and lower conduits 109, 111 and a hand-operable valve 113 provide means for draining liquid fat from pan 81 (see FIGS. 4 and 5). An L-shaped handle 115 is removably fitted in barrel 117 of valve 113. Removal of handle 115 from valve 113 permits pan 81 to be lifted readily from base 85 of the cooking unit.

The preferred form of base means 85 (FIGS. 1–9) preferably includes a lower assembly base 119 and an upper base assembly 121 removably resting on lower base assembly 119.

Lower base assembly 119 is table-like and includes legs 122 supporting upper structure including a top wall 123 having a horizontal top surface 125. Heating means 87 of cooking unit 25 preferably is housed in lower base 119 and preferably includes a pair of heating elements or burners 127. Gas supply means including line 128 energize burners 127. Valves 129 in burners 127 regulate the passage of gas through burners 127; turnably manipulating knobs 131 control the flame height of burners 127. Although not shown, left and right valves 129 of each cooking unit 125 preferably include linkage means for simultaneous movement; preferably left and right burners valves 129 are linked together in such a manner that turnably manipulating one valve will simultaneously and equally turnably manipulate the other valve. Such means permits equal simultaneous adjustment of both burners 127 of each cooking unit. Top wall 123 of lower base assembly 119 is provided with a longitudinally extending elongated opening 133 (see FIGS. 4 and 5). Opening 133 provides passageway means for flame issuing from burners 127 and provides opening means for the reception of downwardly projecting valved drain passageway means 109, 111, 113 of pan 81.

Upper base assembly 121 (FIGS. 1–5 and 7) is rectangular frame-like and generally annular, and includes front, rear right and left sections 135, 137, 139, 141 (see FIG. 3) and with each section being in cross-section of inverted L-configuration (see FIGS. 4, 5 and 7). Circumferentially extending horizontal and vertical top and sidewall means 143, 145 define an oblong upwardly opening chamber (when pan 81 is removed from upper base 121) or defines a downwardly opening annular chamber 147 when pan means 81 is received and supported in upper base 121. The top and sidewall means 143, 145 respectively of sections 135, 137, 139, 141 of upper base assembly 121 preferably are of laminated and insulated construction.

Each section 135, 137, 139, 141 of upper base 121 preferably includes inside and outside plate means 149, 151 and insulation panel means 153. Each section of the upper base preferably includes a panel 153 of insulating material sandwiched between inside and outside plates 149, 151. Top wall means 143 of the upper base defines substantially circumferentially extending internal flange structure 155 removably supporting pan 81.

The means for removably receiving pan 81 in base assembly 121 in addition to flange structure 155 includes external flange structure 157 circumferentially extending about and secured to the upper portion of pan body 89. External flange 157 is integrally formed with rim 159 which is fixedly secured to vertical rectangular upper wall portion 161 of pan body 89. A second external flange 163, arranged above external flange 157, is integrally formed with rim 159 and provides latch means for securing lid 83 on pan 81. Upper base 121 is adapted to be removably supported on lower base 119 with the lower bounding surfaces 165 of upper base assembly 121 restingly engaging horizontal top surface 125 of lower base assembly 119. Upper base 121 is centered over opening 133 in the topwall of lower base 119 and is symmetrically arranged over right and left burners 127. Pan means 81 is adapted to be pendantly supported in upper base 121 with external flange structure 157 of pan means 81 restingly engaging internal flange structure 155 of upper base 121. Pan means 81 is adapted to be readily manually lifted from upper base assembly 121 when desired. A flue pipe 167 is horizontally fitted in rear section 137 of upper base assembly 121. Flue 167 provides passageway means for exhausting burned gases and heat from annular chamber 147 of base 121.

Lid 83 is adapted for sealing securement over the upwardly opening opening of pan body 89 and includes lever operative latch means 169. Lid 83 is generally flat and rectangular and preferably formed of aluminum alloy or other lightweight material. Lid 83 is formed with a downwardly opening generally rectangular recess 171 symmetrically arranged in the under portion of the lid. Recess 171 is defined substantially by a flat base surface 173 and oppositely arranged side and end beveled surfaces 175, 177 arranged around the periphery of base surface 173. A resilient rectangular gasket 179 is securely fitted in a groove 181 extending around the periphery of lid recess 171. Gasket 179 is adapted to matingly engage upper edge portion 183 of pan rim 159 and provide sealing securement of lid 83 on pan 81.

Lid latch means 169 includes: a plurality of bolt members 185 intermittently spaced uniformly about the rectangular periphery of lid body 187, a lever 189 horizontally pivoted on lid body 187 and linkage means 191 operatively interconnecting lever 189 and bolt members 185. Bolt members 185 are turnably secured respectively in semi-cylindrical protrusions 193 arranged around the periphery of lid body 187. Vertical shank portions 195 respectively of bolt members 185 are turnably secured respectively in apertures 197 in lid body protrusions 193. Toe portions 199 projecting horizontally respectively from bolt shanks 195, and fixed thereto, are adapted to turnably removably engage the underside of external latch flange 163 on the rim of pan body 89.

Lid latch lever 189 is generally straight and includes a flattened proximal portion 201 and a cylindrical handle portion 203. A vertical pin 205 fixed in upper surface 207 of lid body 187 pivotally fulcrums latch lever 189 from lid body 187. Lid latch linkage 191 includes: a plurality of arms 209 fixed horizontally respectively on bolts 185, side bolt connecting link members 211, end bolt connecting link members 213, and link 214. Vertical pins 215 arranged serially along respective side bolt connecting links 211 articulatingly turnably secure respective bolt arms 209 to link members 211. Pins 217, 219 arranged respectively in opposite end portions of links 213, 214 pivotally connect respectively links 213, 214 with end bolt arms 209 and connecting links 211. Pins 221 extending respectively through proximal portion 201 of lever 189 and links 213, 214 pivotally interconnect lever 189 and links 213, 214. Turnably shifting lever 189 engages or disengages bolt member toe portions 199 with rectangular latch flange 163 on pan rim 159. Thus, turnably shifting lever 189 simultaneously engages or disengages bolt members 185 with pan rim 159 and secures or loosens lid 83 on pan 81.

A pressure gauge 223 is fitted in lid body 187 for determining the pressure in pan 81. A safety pop-off type valve 225 is fitted in lid body 187 and communicates with the interior of pan 81. Valve 225 is adapted to automatically release the air from the interior of the pan when the pressure in the pan exceeds a pre-determined setting. A spigot-type exhaust valve 227 having a handle 229 is fitted in lid body 187 and communicates with the interior of pan means 81. Exhaust valve 227 is adapted for exhausting the pressured air from the interior of pan 81 prior to opening lid 83. A horizontal handle 231 is fixedly secured between tab portions 233 of lid body 187. Handle 231 provides hand grip means for raising and lowering lid 83 and respectively for covering and uncovering the interior of pan 81.

The hinge means for lid 83 hingedly secures the lid from base means 85; lid 83 preferably is pivotally secured on rear section 137 of upper base 121. The lid hinge means (as best seen in FIGS. 3, 5 and 6) includes a pair of base members 235 having horizontal pins 237, and a pair of tab portions 239 having downwardly opening slots 240. Base members 235 are fixedly secured on the upper surface of upper base rear section 137 with pins 237 being in coaxial alignment. Pair of tabs 239 are integrally formed with lid body 187 and each extends rearwardly and downwardly from the rear periphery of the lid body. Bifurcated downwardly projecting portions 241 of tabs 239 define the downwardly projecting slots 240 in tabs 239. Lid 83 may be readily removed from base means 85 by lifting and disengaging bifurcated portions 241 from engagement with horizontal pins 237.

Supply conduit means 27 provides gravity flow dispensing means for conducting fat liquid from second tank 17 to a selected one of cooking units 25. Supply conduit means 27 includes a trunk tube means 243 extending generally horizontally from second tank 17 and a plurality of branch tube means 245 turnably coupled to and communicating with trunk tube means 243. Trunk tube means 243 includes a generally straight horizontal main portion 246 having an inlet portion 247 and a plurality of outlet portions 249. Inlet end portion 247 of trunk tube main portion 246 is communicatingly connected with the lower level of tank 17 by a pair of hand valves 250; the pair of trough-like areas in the lower interior of tank 17 formed by undulated bottom 33 is communicated through valves 250 with inlet portion 247 of tube 243. Two valves 250 (rather than one valve) are provided in order that tank 17 may be drained to a level below the level of raised ridge 251 of tank bottom 33.

Each branch tube means 245 normally extends vertically and includes a main straight portion 253 and a pair of spout portions 255. Coupling means 257 communicatingly couples outlet portions 249 of trunk tube means 243 with inlet portions 261 respectively of branch tubes 245. Coupling means 257 at each branch tube 245 is preferably pivotable and provides means for moving a respective branch tube between a raised upright disposition and a lowered downwardly slanted disposition. The lower inlet portion 261 of each branch tube 245 is in the form of a cylindrical cuff-like portion. Cuff portion 261 is turnably sealingly secured between inner and outer disc members 265, 267 secured respectively on the distal end of respective tubular outlet portions 249 of trunk tube means 243. Inner disc portions 265 of coupling means 257 are respectively ported for the passage of fat from trunk tube 243 to branch tubes 245. Mating annular surfaces respectively of cuff portions 261 and disc portions 265, 267 provides frictional contact means for holding a branch tube 245 in a desired position relative to trunk tube 243. Each branch tube 245 is adapted to be selectively moved between a raised upright disposition whereat a spout portion outlet end 269 is arranged at a level above the level of the liquid fat contained in tank 17 and a lowered downwardly slanted disposition whereat spout outlet 269 is arranged directly over the interior of the upwardly opening pan of a cooking unit 25 and arranged at level below the level of the cooking fat contained in tank 17. Letter R (in FIG. 1) indicates the branch tubes in raised dispositions; letter L indicates a branch tube in a lowered disposition (indicated in broken lines).

With lid 83 raised and in the open position (indicated by letter O in FIG. 1) frypan 81 may be filled with preheated liquid fat by turning branch tube 245 downwardly and over the open interior of the frypan. When branch tube 245 is in a lowered disposition, the fat liquid from tank 17 is conducted through trunk and branch conduits 243, 245 and into a selected one of frypans 81.

In let portion 247 of trunk conduit 243 is turned upwardly and provides a vent tube portion 271 extending upwardly and terminating in a vent opening 273. An overflow tube 275 communicates with the upper interior of vent tube 271 and opens downwardly in the interior of tank 15. Overflow tube 275 in conjunction with vent tube 271 provides safety means for returning liquid fat to tank 15 from tank 17 when the liquid fat level in tank 17 reaches a predetermined elevation.

Drain conduit means 29 is adapted for conducting fat liquid from each cooking unit 25 to third tank 19. Drain conduit means 29 includes a drain tube 277 slanted slightly horizontally and supported underneath the row of cooking units. Outlet portion 279 of drain tube 277 is arranged over the open interior of tank 19; inlet portions 281 respectively of tube 277 open upwardly respectively under each cooking unit pan 81; short lower drain conduits 111 respectively of each frypan 81 is loosely received in the upwardly opening opening of inlet portions 281 of drain tube 277. When removing pan 81 from a cooking unit 25, the respective pan drain conduit 111 is freely removable from a respective inlet portion 281 of tube 277. Preferably, each time after cooking a batch of food items in a cooking unit 25 the drain valve 113 of the cooking unit frypan 81 is opened and the used charge of fat liquid in the frypan is drained through the drain tube 277 into the sediment tank 19.

In the preferred embodiment, the construction of base means 85 and the arrangement of heating means 87 permits the use only of lower base assembly 119: When desired, pan 81 along with upper base assembly 121 may be removed from lower base assembly 119. This permits the lower base and heating means 87 to be used substantially as an ovenless cooking stove and with top surface 125 of lower base assembly 119 providing a cooking surface for supporting hand manipulated pots and pans.

Preferably in carrying out the operation of the apparatus of the present invention and in order to know when the cooking fat in the cooking units have reached the proper temperature before the food items are placed therein, a bulb type thermostat 283 of well known construction is preferably provided. Thermostat 283, which is preferably manually placed in a selected pan 81, is provided with a suitable electric circuit shown schematically as at 285 and which incudes a light 287 that turns off when the heating fat reaches the exact desired temperature.

In the modified embodiment of the invention the cooking apparatus is the same as the above-described embodiment except for each cooking unit. The modified embodiment cooking unit indicated 25' (illustrated in FIG. 10) includes a frypan and lid 81', 83'; base means 85'; and heating means 87'. Base means 85' preferably is integrally fabricated and includes lower base structure 119' and upper base structure 121'. Lower base structure 119' supportingly houses gas burners 127' and is adapted to rest on a supporting surface S. Upper base structure 121' includes a horizontal top wall 143' including structure defining a circumferential internal flange 155'. The internal flange of top wall 143' defines an oblong upwardly opening opening for the reception of pan body 89'. External flange portion 157' extending about the rim of pan 81' is adapted to restingly engage internal flange portion 155' of base means upper structure 121'. Insulating panel means 153' preferably is fitted around the interior surfaces of top and side walls 143', 145' of base 85'. Cooking unit 25' includes handle means 131' for regulating burners 127' and flue means 167' for passage of combustion gases from the interior of base 85'. Hinge means 235', 239' hingedly supports lid 83' from base means 85'. A handle 231' provides hand grip means for raising and lowering lid 83'.

I claim:

1. Deep fat frying apparatus comprising a first tank, a second tank, each tank adapted to contain cooking fat, first and second heating means for heating the fat respectively in said first and second tanks and for maintaining the fat in a liquid state, first liquid conveying means for conveying fat liquid from said first tank to said second tank, a third tank, second liquid conveying means for conveying fat liquid from said third tank to said first tank; at least one cooking unit adapted for cyclic operation and for deep fat frying successive batches of food items and including an upwardly opening pan having a drain passageway in the bottom thereof and valve means for selectively opening and closing said drain passageway, said cooking unit including heating means for heating the liquid fat in said pan means; and including supply conduit means for conducting fat liquid from said second tank to said cooking unit pan means and including drain conduit means for conducting liquid fat from said pan means drain passageway to said third tank.

2. The apparatus of claim 1 which additionally includes filtering means for filtering the fat liquid as it is conveyed from said first tank to said second tank.

3. The apparatus of claim 1 wherein said first heating means includes a heating element arranged contiguous the bottom of said first tank, line means adapted for connection to an energy source for energizing said heating element and thermostat means responsive to temperature changes in the fat liquid in said first tank for controlling the passage of energy through said line means and adapted for maintaining the temperature of the fat liquid in said first tank at a selected range.

4. The apparatus of claim 1 wherein said first liquid conveying means includes first conduit means for conducting the liquid from said first tank to said second tank, pump means fitted in said first conduit means for moving the fat liquid through said first conduit means and including control means responsive to the changing level of the liquid fat in said second tank means for controlling the passage of liquid passing through said first conduit means and for establishing and maintaining the level of the liquid fat in said second tank at a selected range.

5. The apparatus of claim 1 wherein said supply conduit means includes gravity flow dispensing means for conducting fat liquid from said second tank to said cooking unit including trunk tube means slanted slightly horizontally having an inlet portion communicating with the interior lower level of said second tank and having an outlet portion arranged at a level slightly below the level of said inlet portion, a branch tube including a main portion and a short spout portion and with the open end portions respectively of said main and spout portions of said branch tube defining respectively inlet and outlet ends of said branch tube, and coupling means sealably turnably coupling said outlet portion of said trunk tube with the inlet end of said branch tube for selectively turnably moving said branch tube along a vertical plane and including means adapting said branch tube to be selectively moved between a raised upright disposition whereat said spout portion outlet end is arranged at a level above the level of the liquid fat contained in said second tank and a lowered downwardly slanted disposition whereat said spout outlet end is arranged directly over the interior of the upwardly opening pan of said cooking unit and arranged at a level below the level of the liquid fat contained in said second tank.

6. The apparatus of claim 1 wherein said drain conduit means for conducting liquid fat from said cooking unit pan means drain passageway to said third tank includes drain tube means having inlet and outlet portions and with said drain tube means being slightly horizontally slanted and with said inlet portion being arranged underneath and adapted to catch liquid fat draining from the passageway of said cooking unit pan means and with said outlet portion being arranged at a level below the level of said inlet portion and with the outlet portion of said drain tube communicating with the interior of said third tank.

7. The apparatus of claim 1 in which said cooking unit comprises an open-topped pan having generally continuously rounded bottom and side portions defining inside and outside generally smoothly extending rounded bottom and side surfaces, a lid, means for removably sealingly securing said lid over the open top of said pan, base means including structure defining an upwardly opening chamber, means removably mounting said pan in said base means with said rounded bottom and side portions being received in the upwardly opening chamber of said base means and heating means including a heating element arranged contiguous said pan bottom for heating said pan.

8. In apparatus for deep fat frying food items, a cooking unit comprising a horizontally elongated open-topped pan including a body section having longitudinally extending transversely rounded bottom wall and parallel extending opposingly arranged sidewall portions and with each sidewall portion being horizontally concavo-convex configured, a lid, means sealingly securing said lid over the open top of said pan, base means including structure defining an upwardly opening chamber, means removably mounting said pan in said base means with said pan body section being received in the upwardly opening chamber of said base means, and heating means including a heating element arranged contiguous said pan bottom wall for heating said pan.

9. The cooking unit of claim 8 wherein said heating means is of gas type and said heating element is in the form of a gas burner and wherein said burner is supported from said base means and is spaced from the bottom of said pan.

10. The apparatus of claim 8 wherein said means removably sealingly securing said lid over the open top of said pan includes hinge means arranged on one side of said pan, pivotally mounting said lid directly on said base means; said lid when in an open disposition allowing free movement in mounting or removal of said pan respectively in and away from said base means.

11. The cooking unit of claim 8 wherein said means removably mounting said pan in said base means includes external flange structure secured to and extending outwardly and substantially circumferentially about the structure defining the opening of the open top of said pan and wherein said base means includes horizontal top wall means including internal flange structure defining an opening of the size adapted to removably receive in vertical free passage the body section of said pan and with said interior flange structure of said base means being of a size and arrangement adapted for supportingly engaging the underside of the external flange of said pan.

12. The cooking unit of claim 11 wherein said base means includes circumferentially extending vertical sidewall means substantially continuously intersecting said horizontal top wall means and in conjunction with said top wall means and the exterior lateral surfaces of said pan means defining a downwardly opening generally shallow circumferentially uniform heating chamber.

13. The cooking unit as defined in claim 8 wherein said heating means is of gas type and said heating element is in the form of a gas burner, wherein said base means includes a lower base assembly and an upper base assembly, wherein said lower base assembly includes top wall means defining a horizontal top surface arranged superjacently of and extending generally circumferentially about said burner and includes structure defining an opening for passage of flame issuing from said burner, wherein said upper base assembly includes top wall means including internal flanged structure defining an opening of a size adapted to removably receive in vertical free passage the lower portion of said pan body section and wherein said upper base assembly includes substantially low circumferentially extending sidewall means substantially continuously intersecting the top wall means thereof and in conjunction with the exterior lateral surfaces of said pan means defining a substantially shallow downwardly opening circumferentially extending heating chamber; said upper base assembly being removably supported on said lower base assembly with said pan body section being arranged over said gas burner.

14. In apparatus for deep fat frying food items, a cooking unit comprising an open-topped pan having generally continuously rounded bottom and side portions defining inside and outside generally smoothly extending rounded bottom and side surfaces, a lid, means for removably sealingly securing said lid over the open top of said pan, base means including structure defining an upwardly opening chamber, means removably mounting said pan in said base means with said rounded bottom and side portions being received in the upwardly opening chamber of said base means, and heating means including a heating element arranged contiguous said pan bottom wall for heating said pan, said pan including partition means including at least one partition member extending transversely across the interior of said pan thereby defining in said pan a plurality of cooking chambers and wherein said heating means includes burner means arranged respectively under and adapted for heating respectively said plurality of cooking chambers.

15. In apparatus for deep fat frying food items, a cooking unit comprising an open-topped pan having generally continuously rounded bottom and side portions defining inside and outside generally smoothly extending rounded bottom and side surfaces, a lid, means for removably sealingly securing said lid over the open top of said pan, base means including structure defining an upwardly opening chamber, means removably mounting said pan in said base means with said rounded bottom and side portions being received in the upwardly opening chamber of said base means, and heating means including a heating element arranged contiguous said pan bottom for heating said pan, said means removably mounting said pan in said base means including external flange structure secured to and extending outwardly and substantially circumferentially about the structure defining the opening of the open top of said pan and wherein said base means includes horziontal top wall means including internal flange structure defining an opening of the size adapted to removably receive in vertical free passage the lower portion of said pan and with said interior flange structure of said base means being of a size and ararngement adapted for supportingly engaging the underside of the external flange of said pan, said base means including circumferentially extending vertical sidewall means substantially continuously intersecting said horizontal top wall means and in conjunction with said top wall means and the exterior lateral surfaces of said pan means defining substantially a downwardly opening generally annular heating chamber, said top wall means and said vertical sidewall means being of laminated construction and substantially all sections and a particular section of said wall means including inside plate means, outside plate means and insulating means sandwiched between said inside and outside plate means.

16. In apparatus for deep fat frying food items, a deep fat frying pan adapted to receive a quantity of cooking fat and to be heated by open combustion means such as natural gas flame, said frying pan including a horizontally elongated open-topped body section having longitudinal parallel extending opposingly arranged concavo-convex configured sidewall portions substantially symmetrically arranged relative to a longitudinal centerline of said pan body section and with the concave surface of each sidewall portion confronting the concave surface of the other sidewall portion, and including a longitudinally extending transversely downwardly rounded bottom wall portion smoothly integrally intersecting respectively said sidewall portions.

17. The apparatus as defined in claim 16 wherein said pan body section includes opposingly arranged transversely extending generally planar vertical end portions integrally sealingly intersecting the bottom wall and sidewall portions of said pan body section.

18. The apparatus as defined in claim 16 wherein said pan body section includes at least one partition portion extending transversetly across the interior of said pan defining in said pan body substantially a plurality of cooking chambers.

19. In apparatus for deep fat frying food items, a deep fat frying pan adapted to receive a quantity of cooking fat and adapted to be heated by open flame combustion means, said frying pan including a pair of spaced apart end walls, oppositely arranged concavo-convex side wall portions extending between said end walls, a downwardly rounded bottom wall portion integrally intersecting said sidewall portions and extending between said end walls, said sidewall portions and said bottom wall portion being perpendicular to said end walls, said sidewall portions being symmetrically arranged relative to a vertical plane extending through the mid portions of said end walls, and said concavo-convex sidewall portions being arranged with the concave sides thereof confronting one another.

20. The apparatus of claim 19 in which said pan includes a vertical rectangular upper wall portion integrally formed with and upstanding from said sidewall portions and said end wall portions, the parts of said upper wall portion upstanding from said sidewall portions being spaced closer together than the mid portions of said concavo-convex sidewall portions.

References Cited
UNITED STATES PATENTS

| | | | |
|---|---|---|---|
| 3,107,601 | 10/1963 | Longmire | 99—408 |
| 3,314,416 | 4/1967 | Wagner | 99—403 |
| 3,332,338 | 7/1967 | Wein | 99—403 |

ROBERT W. JENKINS, Primary Examiner